United States Patent

Marcatili

[11] 3,712,705
[45] Jan. 23, 1973

[54] AIR CLAD OPTICAL FIBER WAVEGUIDE

[75] Inventor: Enrique Alfredo Jose Marcatili, Runson, N.J.

[73] Assignee: Bell Telephone Laboratories, Incorporated, Murray Hill, Berkeley Heights, N.J.

[22] Filed: May 28, 1971

[21] Appl. No.: 147,845

[52] U.S. Cl. ............................350/96 WG, 65/DIG. 7
[51] Int. Cl. .....................................G02b 5/14
[58] Field of Search ..................................350/96 WG

[56] References Cited

UNITED STATES PATENTS

| 3,318,651 | 5/1967 | Karbowiak | 350/96 WG |
| 3,434,774 | 3/1969 | Miller | 350/96 WG |
| 3,535,017 | 10/1970 | Miller | 350/96 WG |
| 2,595,078 | 4/1952 | Iams | 350/96 WG UX |
| 2,979,632 | 4/1961 | MacNeille | 350/96 B UX |

FOREIGN PATENTS OR APPLICATIONS

| 1,111,419 | 4/1968 | Great Britain | 350/96 B |

*Primary Examiner*—John K. Corbin
*Attorney*—R. J. Guenther and Arthur J. Torsiglieri

[57] ABSTRACT

An air clad optical fiber is described comprising a low-loss dielectric core, having a polygonal cross section disposed within a circular jacket. Because of its shape, the core is, in effect, totally surrounded by air, contacting the outer jacket at only its corners. To further minimize the number of contacting regions, and increase the spacing between core and jacket, the latter is made oversized.

6 Claims, 5 Drawing Figures

INVENTOR
E. A. J. MARCATILI

AIR CLAD OPTICAL FIBER WAVEGUIDE

This invention relates to multimode optical waveguides.

BACKGROUND OF THE INVENTION

The typical light-guiding optical fiber comprises a cylindrical core of low-loss dielectric material, surrounded by a low-loss cladding of lower refractive index. As is known, the light-gathering efficiency of such a guide, as well as its tolerance to bends, are enhanced when the refractive index of the cladding is as small as possible. In particular, in a multimode fiber excited by an incoherent source, (in which case the core can be made relatively large,) a cladding of free space would be best.

An approximation of such a light guide is illustrated in British Pat. No. 1,178,500 wherein the internal wall of a supporting tube is provided with projections which, in turn, support the cylindrical core. In this manner, a layer of air is in contact with much of the outer surface of the core. However, it is a disadvantage of this arrangement that there are significant scattering losses at each of the supporting projections. Over an extended distance, these losses become relatively large.

It is, accordingly, the object of the present invention to reduce the losses in an air clad optical fiber.

SUMMARY OF THE INVENTION

An air clad fiver guide, in accordance with the present invention, comprises a polygonal core supported within a circular outer jacket. Because of its shape, the core is, in effect, totally surrounded by air, contacting the outer jacket at only its corners. However, since the jacket and the core are now in continuous and uniform contact along their entire length, the scattering losses are minimal, occurring only occasionally at inadvertent discontinuities. Furthermore, since the field intensity at the corners is very small, the resulting scattering losses, when they do occur, are correspondingly small. To further reduce the number of contacts between the core and the jacket to a maximum of only two, and, thereby, to further reduce the potential for scattering losses, and to increase the distance between the core and the jacket and, thereby, reduce the losses in the jacket, the latter is made slightly oversized.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
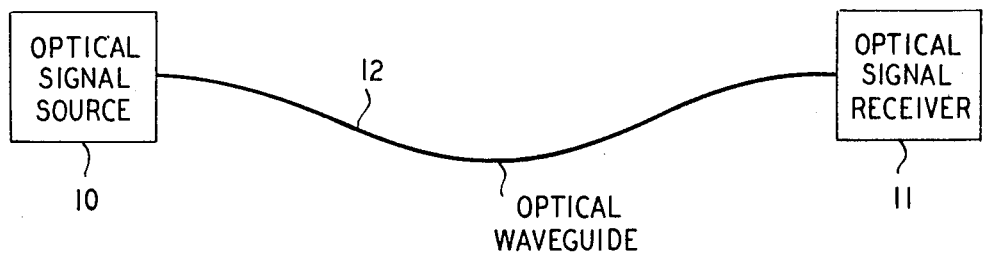
FIG. 1 shows an optical wave transmission system using optical fibers.
Figure 2:
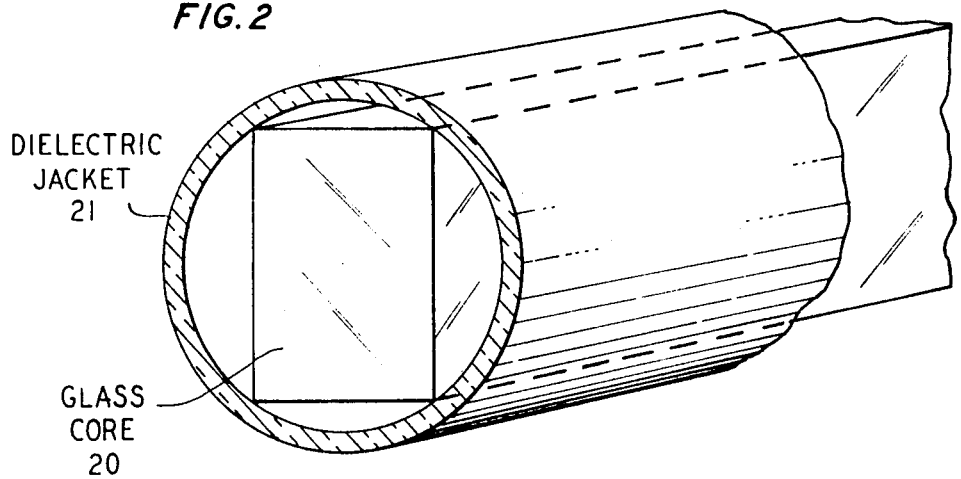
FIGS. 2–5 show a variety of optical fibers in accordance with the present invention.

Referring to the drawings, FIG. 1 shows an optical system including an optical signal source 10 and an optical signal receiver 11, connected together by means of an optical waveguide 12. The latter contains one or more optical fibers, each of which typically comprises a cylindrical low-loss dielectric core, surrounded by a cylindrical low-loss dielectric cladding of lower refractive index. Since the light gathering efficiency of such a guide, as well as its tolerance to bends, are enhanced when the difference in the refractive indices of the core and cladding is increased, an air cladding is advantageously used. In accordance with a first embodiment of the invention, such a cladding is obtained using a rectangular shaped core disposed within a circular outer jacket, as illustrated in FIG. 2.

In an article entitled, "Dielectric Rectangular Waveguide and Directional Coupler for Integrated Optics", published in the September 1969 issue of the *Bell System Technical Journal*, applicant describes the electromagnetic field configuration associated with a rectangular dielectric waveguide. As shown, most of the wave energy is confined within the core material, with a small faction extending into the surrounding cladding. On pages 2,147 to 2,149 of the same issue, J. Goell shows a number of intensity pictures for different modes in a rectangular waveguide. As will be noted, the electromagnetic fields at the corner of the rectangular guide are minimal. As will now be explained, this feature of the rectangular guide is utilized in the present invention as a means of minimizing scattering losses.

Referring again to FIG. 2, the optical fiber, in accordance with this first embodiment of the invention, comprises a low-loss, rectangular dielectric core 20, (formed by drawing the core material through a rectangular aperture) disposed within a circular, outer jacket 21. In this particular embodiment, the diameter of the jacket is equal to the diagonal of the rectangular core so that the four corners of the core make continuous and uniform contact with the inner wall of the jacket over its entire length. Because of this, the scattering losses are, ideally, eliminated. In practice, there may occasionally be some scattering at the corners due to imperfections in the materials. However, as indicated above, the field strength at the corners of a rectangular guide is very weak and, hence, any loss due to scattering, when it occasionally does occur, will be correspondingly small. As for the rest of the core surface, it is in contact with the air trapped between it and the outer jacket, forming an air cladding. Thus, jacket 21, in this embodiment, is more of a protective member and, hence, its optical properties are of less importance than are the optical properties of the cladding of a conventional optical fiber. Nevertheless, because of the proximity of the core and jacket, some of the electromagnetic field does extend into the jacket. Hence, the latter is advantageously made of a low-loss dielectric material of lower refractive index than core 20.

While the intensities of the electromagnetic fields at the corners of core 20, and in the jacket are relatively small, some loss is, nevertheless, incurred due to scattering along the four regions of contact between core 20 and jacket 21, and in the jacket itself. It would be advantageous, therefore, if the number of contacts could be reduced and the distance between the core and jacket increased. This is achieved in the next embodiment of the invention now to be considered in connection with FIG. 3.

Figure 3:
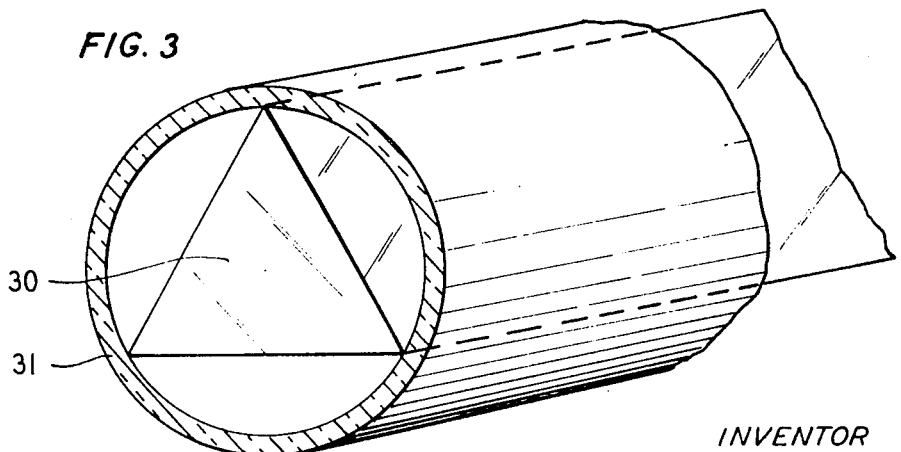
Figure 4:
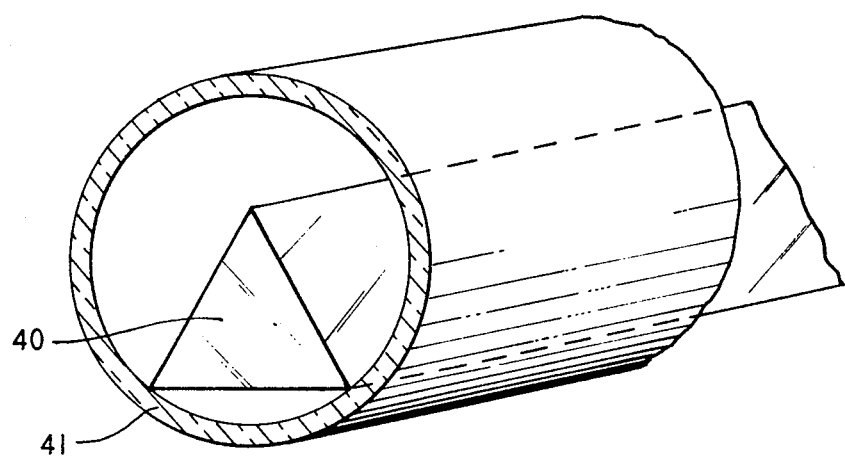

In the embodiment of FIG. 3, a core 30, having a triangular cross section is disposed within a circular, outer jacket 31. As in the previous embodiment, both core 30 and jacket 31 are made of low-loss dielectric materials, with the core having a higher refractive index than the jacket. As will be noted, in this embodiment there are only three regions of contact between the core and the jacket, thus further reducing the potential for scattering losses in the guide. In addition, the spacing between the jacket and core is greater, thus reducing losses in the jacket. A still further reduction can be realized by making the outer jacket slightly oversized, as is illustrated in FIG. 4. In this arrangement, the distance between core 40 and jacket 41 is greatly increased, and the maximum number of contacts between the core and the jacket is reduced to two. More generally, the rigid core will be suspended away from the jacket, thereby making no contact with the jacket over extended longitudinal distances.

Figure 5:
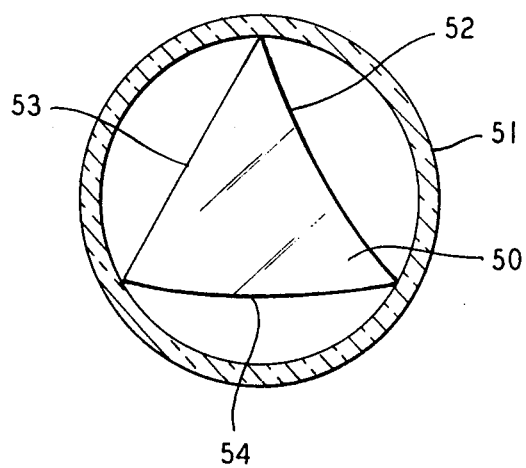

In all of the embodiments, the core is shaped to have corners characterized by low field intensities and to provide small area contact regions. In this manner an air space is created between the core and the jacket, and the potential for losses due to scattering at the contact regions is reduced. It is readily apparent that other polygonal shapes can also be used, and that the core need not have straight sides. For example, in the embodiment of FIG. 5, the triangular-like core 50, as illustrated, has one straight side 53, one concave side 52 and one convex side 54. So long as the radius of curvature of the sides is greater than that of the jacket, as is the case with sides 53 and 54, an air space will be formed between the core and the jacket. With respect to side 52, its radius of curvature is negative relative to that of jacket 51 and, hence, there will always be an air space formed between that side of the core and the jacket.

Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An optical waveguide comprising:
a dielectric core, having an $n$-sided polygonal cross section, disposed within a circular protective jacket, where $n$ is any integer greater than two;
wherein said core contacts said jacket solely along the vertices formed by adjacent pairs of said sides;
and wherein the region between said core and said jacket is filled with a gas whose refractive index is less than that of said core.

2. The waveguide according to claim 1 wherein said core has a rectangular cross section.

3. The waveguide according to claim 1 wherein said core has a triangular cross section.

4. The waveguide according to claim 1 wherein the diameter of said jacket is larger than the largest transverse dimension of said core.

5. The waveguide according to claim 1 wherein the radii of curvature of the sides of said core are greater than the radius of said jacket.

6. The waveguide according to claim 1 wherein said sides are concave.

* * * * *